US012553251B2

(12) United States Patent
Gray et al.

(10) Patent No.: US 12,553,251 B2
(45) Date of Patent: Feb. 17, 2026

(54) YIELDING LINK, PARTICULARLY FOR ECCENTRICALLY BRACED FRAMES

(71) Applicants: Cast Connex Corporation, Toronto (CA); THE GOVERNING COUNCIL OF THE UNIVERSITY OF TORONTO, Toronto (CA)

(72) Inventors: Michael Gray, Whitby (CA); Juan-Carlos De Oliveira, Pickering (CA); Constantin Christopolous, Toronto (CA); Tarana Haque, Vaughan (CA); Kyla Tan, Toronto (CA)

(73) Assignee: CAST CONNEX CORPORATION, Toronto (CA)

( * ) Notice: Subject to any disclaimer, the term of this patent is extended or adjusted under 35 U.S.C. 154(b) by 0 days.

(21) Appl. No.: 18/506,791

(22) Filed: Nov. 10, 2023

(65) Prior Publication Data

US 2024/0076892 A1 Mar. 7, 2024

Related U.S. Application Data

(63) Continuation of application No. 15/531,773, filed as application No. PCT/CA2014/051147 on Dec. 1, 2014, now abandoned.

(51) Int. Cl.
*E04B 1/98* (2006.01)
*E04B 1/24* (2006.01)
(Continued)

(52) U.S. Cl.
CPC ........... *E04H 9/021* (2013.01); *E04B 1/2403* (2013.01); *E04B 1/98* (2013.01); *E04H 9/0237* (2020.05);
(Continued)

(58) Field of Classification Search
None
See application file for complete search history.

(56) References Cited

U.S. PATENT DOCUMENTS

| 3,748,795 A | 7/1973 | Berntsen |
| 4,731,966 A | 3/1988 | Fujita et al. |
| (Continued) | | |

FOREIGN PATENT DOCUMENTS

| JP | 02176229 A | 7/1990 |
| JP | 07332419 A | 12/1995 |
| (Continued) | | |

OTHER PUBLICATIONS

International Preliminary Report on Patentability dated Jun. 6, 2017 from PCT/CA2014/051147, 6 pgs.

*Primary Examiner* — Phi D A
(74) *Attorney, Agent, or Firm* — Jenna L. Wilson; Wilson Lue LLP

(57) ABSTRACT

A structural yielding link, particularly for use in an eccentrically braced frame arrangement or in a linked column frame arrangement having a first end having a means for connecting to a face of a first beam and a second end having a means for connecting to a face of a second beam; a first variable cross-section portion and a second variable cross-section portion extending from the first end and from the second end, respectively; and a constant cross-section portion joining the first variable cross-section portion and the second variable cross-section portion.

19 Claims, 13 Drawing Sheets

(51) Int. Cl.
*E04H 9/02* (2006.01)
*F16F 7/12* (2006.01)

(52) U.S. Cl.
CPC ............ *E04H 9/024* (2013.01); *E04H 9/025* (2013.01); *F16F 7/12* (2013.01); *E04B 2001/2442* (2013.01); *E04B 2001/2451* (2013.01); *E04B 2001/2457* (2013.01); *E04B 2001/2496* (2013.01); *E04H 9/028* (2013.01)

(56) References Cited

U.S. PATENT DOCUMENTS

| | | | |
|---|---|---|---|
| 4,887,788 A | 12/1989 | Fischer | |
| 4,901,486 A | 2/1990 | Kobori et al. | |
| 4,942,703 A | 7/1990 | Nicolai | |
| 4,959,934 A | 10/1990 | Yamada et al. | |
| 5,065,555 A * | 11/1991 | Kobori .................. | F16F 7/12 248/580 |
| 5,163,256 A | 11/1992 | Fukumoto et al. | |
| 5,630,298 A | 5/1997 | Tsai et al. | |
| 5,971,347 A * | 10/1999 | Tsai ..................... | F16F 15/02 248/618 |
| 7,174,680 B2 | 2/2007 | Smelser | |
| 7,185,462 B1 | 3/2007 | Smelser | |
| 7,305,799 B2 * | 12/2007 | Smelser ................ | E04C 3/02 52/855 |
| 8,424,252 B2 | 4/2013 | Tsai et al. | |
| 8,590,256 B2 | 11/2013 | Hinchman et al. | |
| 8,763,320 B1 * | 7/2014 | Chou .................... | E04H 12/16 52/167.3 |
| 2001/0000840 A1 | 5/2001 | Takeuchi et al. | |
| 2005/0166487 A1 | 8/2005 | Tsai | |
| 2013/0283709 A1 | 10/2013 | Christopoulos et al. | |
| 2016/0115703 A1 | 4/2016 | Katayama et al. | |
| 2017/0268252 A1 | 9/2017 | Gray et al. | |

FOREIGN PATENT DOCUMENTS

| | | |
|---|---|---|
| JP | 10102682 A | 4/1998 |
| KR | 20100130371 A | 12/2010 |

* cited by examiner

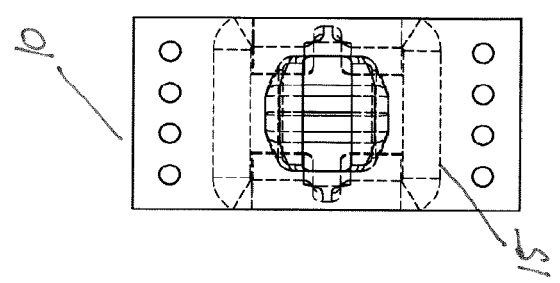
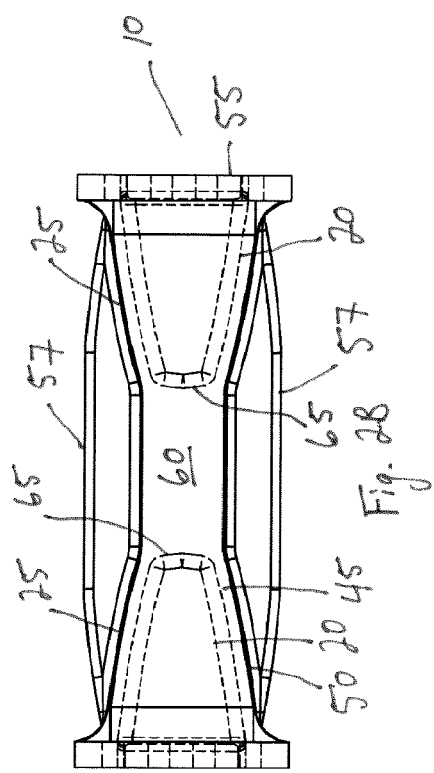
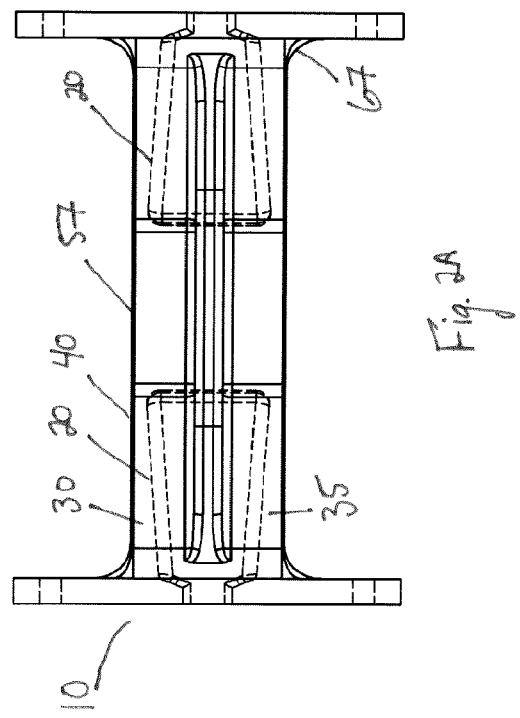
Fig. 2

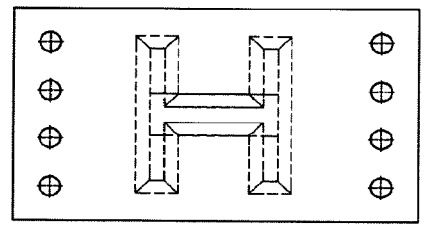
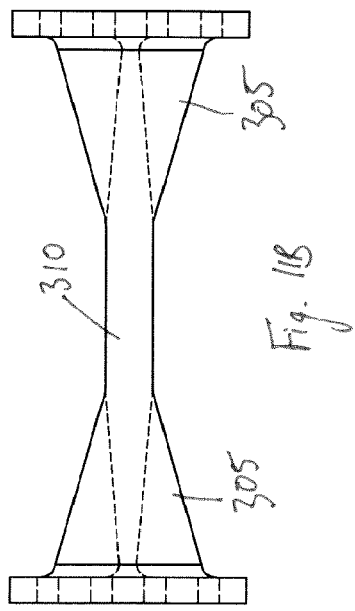 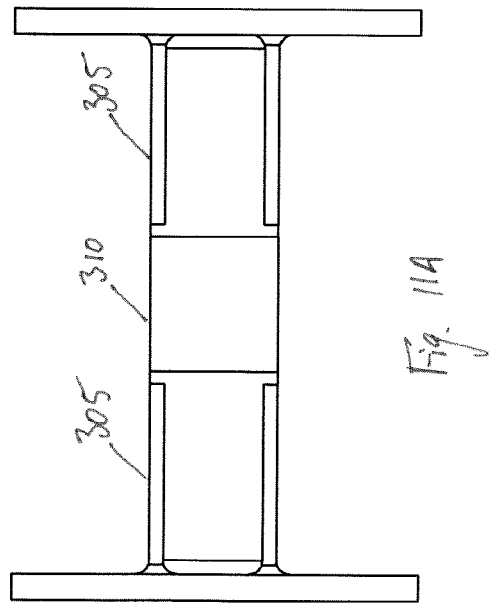
Fig. 11

YIELDING LINK, PARTICULARLY FOR ECCENTRICALLY BRACED FRAMES

FIELD OF THE INVENTION

The invention relates generally to building frame structures, and particularly to yielding links for use is building frame structures, especially eccentrically braced frames or linked column frames.

BACKGROUND OF THE INVENTION

Eccentrically braced frames (EBFs) are a commonly used, high-ductility lateral load resisting system, generally implemented in steel building constructions. The brace(s) in an EBF are arranged such that at one end the brace(s) are connected to a frame node and at the other end the brace(s) are connected to a beam. In the case where the EBF has one brace per frame, the brace work point is located away from the node defined by the beam column intersection. In the case where the EBF has two braces per frame, the braces do not share a node at center of the beam. Rather, each brace is slightly more inclined, thus moving the two brace end points away from the centre of the beam. In both configurations, the eccentric brace geometry results in shear and bending being applied to a short portion of the continuous beam. This portion of the beam is commonly referred to as the link, or yielding link. During an earthquake, the system is designed such that the link yields in shear or flexure (or a combination of both), thereby limiting the force that can develop in the other structural elements and absorbing seismic energy in a stable manner.

Typically, the link portions of EBFs have been wide flange (W-sections), rectangular hollow sections (HSS), or built-up box sections. EBFs exhibit excellent ductility capacity and perform well after an earthquake. However, after a severe seismic event, the links are somewhat damaged and can require repair or replacement. This led to the development of replaceable links for EBFs.

In an EBF with replaceable links, the link is a separate component from the rest of the beam element(s). The replaceable link is the yielding element of this system and the remaining beam element(s) are intended to remain elastic. This component is bolted or welded to the beam such that there is a predominantly rigid connection capable of transmitting the shear force or bending moment required to yield the link element. Prior research on replaceable links has focused on link elements created from weld-fabricated rolled sections such as W-sections, channels, rectangular hollow structural sections, and build-up box sections. All of these concepts have been continuous, prismatic, constant cross-section sections that yield either in constant shear or in flexural hinging at the ends of the links.

A linked column frame is an arrangement that utilizes replaceable links in a modified structural configuration. The behaviour of the link in the linked column frame is the same as it is in the eccentrically braced frame, thus any link developed for eccentrically braced frames may be equally applicable to a linked column frame, and indeed have been applied to link column frames in the prior art.

It is an object of the invention to provide a replaceable yielding link providing at least one improvement over the prior art.

SUMMARY OF THE INVENTION

According to one embodiment of the invention, there is provided a structural yielding link having a first end having a means for connecting to a face of a first beam or column and a second end having a means for connecting to a face of a second beam or column; a first variable cross-section portion and a second variable cross-section portion extending from the first end and from the second end, respectively; and a constant cross-section portion joining the first variable cross-section portion and the second variable cross-section portion.

In one aspect of the invention, the structural yielding link is used in an eccentrically braced frame arrangement or in a linked column frame arrangement.

In another aspect of the invention, the first and the second variable cross-section portions are hollow along at least a portion of lengths thereof.

In another aspect of the invention, the first variable cross-section portion and the second variable cross-section portion have a cross-section tapering from the respective first and second end portions towards the constant cross-section portion such that a width of the first and second variable cross-section portions at the respective first and second end portions is greater than a width at the constant cross-section portion.

In another aspect of the invention, the first and the second variable cross-section portions are hollow and have an interior wall thickness which is greater at the first and second end portions, respectively than proximate the constant-cross section portion.

In another aspect of the invention, the variable cross-section portions are designed, sized and otherwise dimensioned to promote near simultaneous yielding along a substantial portion of the yielding link when subjected to a linearly varying bending moment diagram.

In another aspect of the invention, the first and the second variable cross-section portions have a width defined by a higher-order function; whereby the higher-order function promotes yielding of the link when the link is subjected to load(s) causing a linearly varying bending moment diagram.

In another aspect of the invention, the first and the second variable cross-section portions are defined such that the cross sectional area along the length of the link is constant; whereby the constant cross sectional area promotes a constant axial strain along the length of the link when the link is subjected to any axial load.

In another aspect of the invention, the constant cross sectional area is achieved by a flange located at the flexural neutral axis of the cross section.

In another aspect of the invention, there is further provided a transition region between the first and second ends and the first and second variable cross-section portions, respectively; where the transition region includes a thickened material portion for limiting stress and strain occurring during yielding of the link from propagating to the means for connecting to the end faces of the first and second beams.

In another aspect of the invention, the variable cross-section portions are designed, sized and otherwise dimensioned to promote yielding along a substantial portion of the yielding link.

In another aspect of the invention, the first and the second variable cross-section portions are hollow and have an interior wall thickness which is constant throughout the first and second variable cross-section portions.

In another aspect of the invention, the first variable cross-section portion and the second variable cross-section portion have a cross-section tapering from the respective first and second end portions towards the constant cross-section portion such that a depth of the first and second variable cross-section portions at the respective first and second end portions is greater than a depth at the constant cross-section portion.

According to another embodiment of the invention, there is provided an eccentrically braced frame arrangement having a first column and a second column; a beam connecting the first column and the second column; the beam having a first portion connected to the first column, a second portion connected to the second column and a yielding link connecting the first portion and the second portion; at least one brace having a node end connected proximate an end of the first column and another end connected to an end of the first portion proximate the yielding link; wherein the yielding link includes a first end having a means for connecting to an end face of the first portion and a second end having a means for connecting to an end face of the second portion; a first variable cross-section portion and a second variable cross-section portion extending from the first end and from the second end, respectively; and a constant cross-section portion joining the first variable cross-section portion and the second variable cross-section portion.

In one aspect of this embodiment, the first and the second variable cross-section portions are hollow along at least a portion of lengths thereof.

In another aspect of this embodiment, the first variable cross-section portion and the second variable cross-section portion have a cross-section tapering from the respective first and second end portions towards the constant cross-section portion such that a width of the first and second variable cross-section portions at the respective first and second end portions is greater than a width at the constant cross-section portion.

In another aspect of this embodiment, the first and the second variable cross-section portions are hollow and have an interior wall thickness which is greater at the first and second end portions, respectively than proximate the constant-cross section portion.

In another aspect of this embodiment, the variable cross-section portions are designed, sized and otherwise dimensioned to promote yielding along a substantial portion of the yielding link.

In another aspect of this embodiment, the first and the second variable cross-section portions have a width defined by a higher-order function; whereby the higher-order function promotes yielding of the link when the link is subjected to load(s) causing a linearly varying bending moment diagram.

In another aspect of this embodiment, the first and the second variable cross-section portions are defined such that the cross sectional area along the length of the link is constant; whereby the constant cross sectional area promotes a constant axial strain along the length of the link when the link is subjected to any axial load.

In another aspect of this embodiment, the constant cross sectional area is achieved by a flange located at the flexural neutral axis of the cross section.

In another aspect of this embodiment, there is further provided a transition region between the first and second ends and the first and second variable cross-section portions, respectively; where the transition region includes a thickened material portion for limiting stress and strain occurring during yielding of the link from propagating to the means for connecting to the end faces of the first and second beams.

In another aspect of this embodiment, the variable cross-section portions are designed, sized and otherwise dimensioned to promote yielding along a substantial portion of the yielding link.

In another aspect of this embodiment, wherein the first and the second variable cross-section portions are hollow and have an interior wall thickness which is constant throughout the first and second variable cross-section portions.

In another aspect of this embodiment, the first variable cross-section portion and the second variable cross-section portion have a cross-section tapering from the respective first and second end portions towards the constant cross-section portion such that a depth of the first and second variable cross-section portions at the respective first and second end portions is greater than a depth at the constant cross-section portion.

BRIEF DESCRIPTION OF THE DRAWINGS

Embodiments will now be described, by way of example only, with reference to the attached Figures, wherein:

FIGS. 2A, 2B and 2C show side, top and end views, respectively, of the yielding link of FIG. 1.

FIGS. 11A, 11B and 11C show side, top and end views, respectively, of the yielding link of FIG. 10.

DETAILED DESCRIPTION

Figure 1:
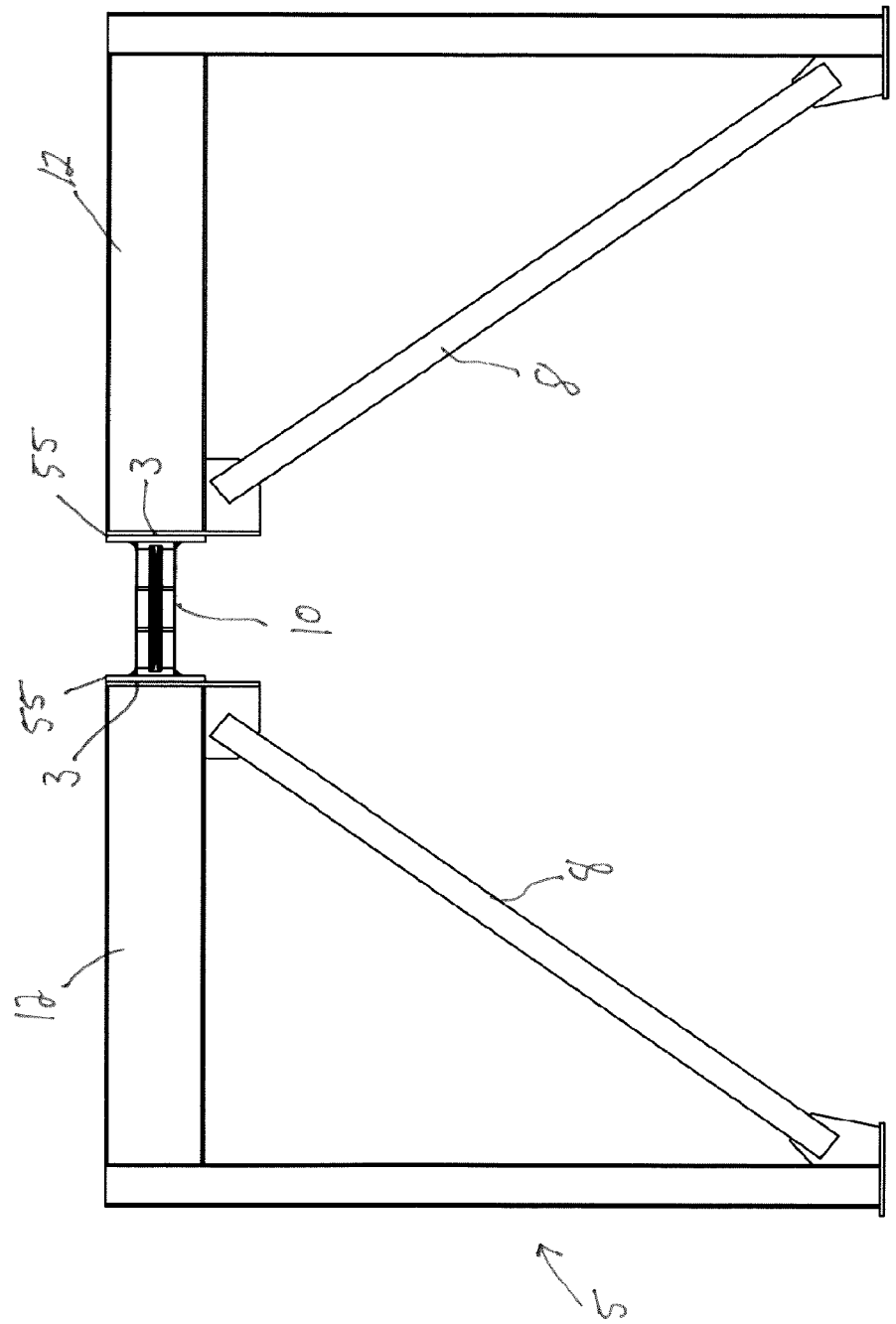
FIG. 1 is an elevation view of a yielding link in an eccentrically braced frame according to one embodiment of the invention.

Embodiments of the invention provide a replaceable yielding link with a cross-section that varies along at least a portion of the length of the yielding link. The yielding link is intended to be used in eccentrically braced frame (EBF) arrangements, or in linked column frame arrangements which exhibit similar structural responses to force-applying events as EBF arrangements. For the purposes of this disclosure, the terms "link" and "yielding link" are used interchangeably. The cross-section of the link is preferably shaped, and otherwise dimensioned such that the change in moment resistance along the length of the link substantially matches the moment diagram that results from the applied forces. This enables the link to yield in flexure along a substantial portion of its length, thereby reducing the inelastic strains resulting from a given amount of plastic link rotation, when compared to the prismatic, constant cross-section links of the prior art. Reducing the inelastic strains in the link increases the displacement capacity of the link and its resistance to low cycle fatigue fractures, thus increasing the ductility of the EBF as a whole. Reducing the inelastic strains also enables the design of more compact, efficient links that provide equal or better performance when compared to the prismatic, constant cross-section links of the prior art. This compact design results at least in easier transport of the link and facilitates replacement following yielding.

A variable cross-section which promotes yielding along substantially the full length of the link could be achieved in a number of ways. For example, if the cross-section is rectangular or square shaped, the link's width out of the plane of the frame could be varied, the link's depth could be varied, or the thickness of the link's walls could be varied. Any combination of these could also result in a shape that promotes near simultaneous yielding along substantially the full length of the link.

The theoretical concept of varying the cross-sectional shape of a building element to promote spread in yielding or for use as energy dissipation mechanisms in base isolated structures has been accomplished in other prior art applications. (For example, see (i) Tsai et al. 1993. *Design Of Steel Triangular Plate Energy Absorbers For Seismic-Resistant Construction*. Earthquake Spectra. Vol. 9, No. 3: pp. 505-528; (ii) Gray et al. 2014. *Cast Steel Yielding Brace System For Concentrically Braced Frames: Concept Development And Experimental Validations*. Vol. 140. No. 4: Paper Number 04013094; and (iii) Japanese Patent Application No. 62-051290 (Publication No. 63-219928) filed Mar. 6, 1987 by Kajima Corp.) However, to the knowledge of the applicants, varying cross-sections have not been used in any form of eccentrically braced frames to increase performance of the yielding link elements, nor have they been used as link elements in a linked column frame exhibiting behaviour analogous to eccentrically braced frames. Furthermore, the adaptations and structural details described herein relating particularly to improving any one of performance, efficiency or ease of construction of the link implemented within an eccentrically braced frame or a linked column frame differ from the prior art of which the applicant is aware.

Embodiments of the link as herein described are intended to replace the continuous beam yielding element of an eccentrically braced frame with a replaceable element. The link is comprised of a yielding segment and two connections, at the ends of the yielding segment. The link is intended for the protection of the structural frame of a building from excessive damage during cyclic dynamic loading conditions (such as an earthquake) by absorbing the majority of the energy and limiting the forces that must be resisted by the structure as a whole. Cyclic dynamic loading conditions refers to repeated cycles of flexural yielding, including the increase in strength that is expected as the replaceable link reaches large inelastic strains (due to over-strength and second-order geometric effects). When a building using the tapered replaceable link is subjected to such loading conditions, the building structure cyclically deforms laterally. These cyclic lateral deformations result in cyclic deformations in which the yielding segment of the link is in double curvature. Under severe loading, the cyclic link deformations cause the link to yield, and to behave in a non-linear manner.

The yielding segment of the tapered replaceable link is shaped based on the expected combination of bending, shear and axial forces such that it will yield flexurally along nearly all of its length. The combination of these forces can vary depending on the structural loading, frame geometry, and location of the link (in the centre of the beam, at the beam column connection, or in a linked column frame). The cross sectional geometry of the link varies along its length (in the direction of the beam axis) such that at any given section its extreme fibers will yield at the same magnitude of externally applied bending moment. This bending moment would be considered the yield bending moment. Continuous yielding along the length of the yielding segment is advantageous over yielding at discrete locations along the length of the link, because, for links of equal length, continuous yielding will result in lower plastic strains for a given link rotation, and therefore higher ductility, than prior art links. Increasing the ductility of an eccentrically braced frame link decreases the likelihood for structural collapse or expensive structural repair.

In addition, at any point along the length of the link the cross-section has sufficient strength to resist the externally applied shear and axial forces that would be associated with the maximum bending moment that would be expected, which is limited by the link's non-linear behaviour and the typical range of deformations for an eccentrically braced frame structure. One possible means of resisting the applied axial forces could be to select the tapering of the cross section such that, in addition to matching the flexural resistance to the applied bending moment, the cross sectional area of the link remains constant along its entire length. In this case, the stress resulting from any magnitude of applied axial force would be constant along the length of the link. When yielding in flexure, such a link would exhibit distributed plasticity along nearly its entire length, regardless of the magnitude of the applied axial force. In the presence of variable axial forces, a link without this feature (i.e. a link with a varying cross sectional area) could potentially yield in a discreet location, rather than exhibiting uniformly distributed flexural yielding along its length. One possible means of achieving constant cross sectional area could be a thickened flange located at the flexural neutral axis of the section. Such a flange would attract much of the applied axial load, but not contribute significantly to the flexural strength. Another possible means of achieving constant cross sectional area would be to taper the thickness of the web(s) or side walls of the section to compensate for loss of area resulting from tapering the flange(s) or top and bottom walls of the section to achieve flexural yielding along substantially the full length of the link.

Further, the transition between the yielding portions of the link and the end connection region could be thickened or otherwise shaped in such a manner so as to limit inelastic strain from spreading into the connection region. This would ensure that yielding only occurs in the yielding portion, thus avoiding fracture in the connection region.

Specific embodiments adhering to these principals will now be described.

Figure 3:
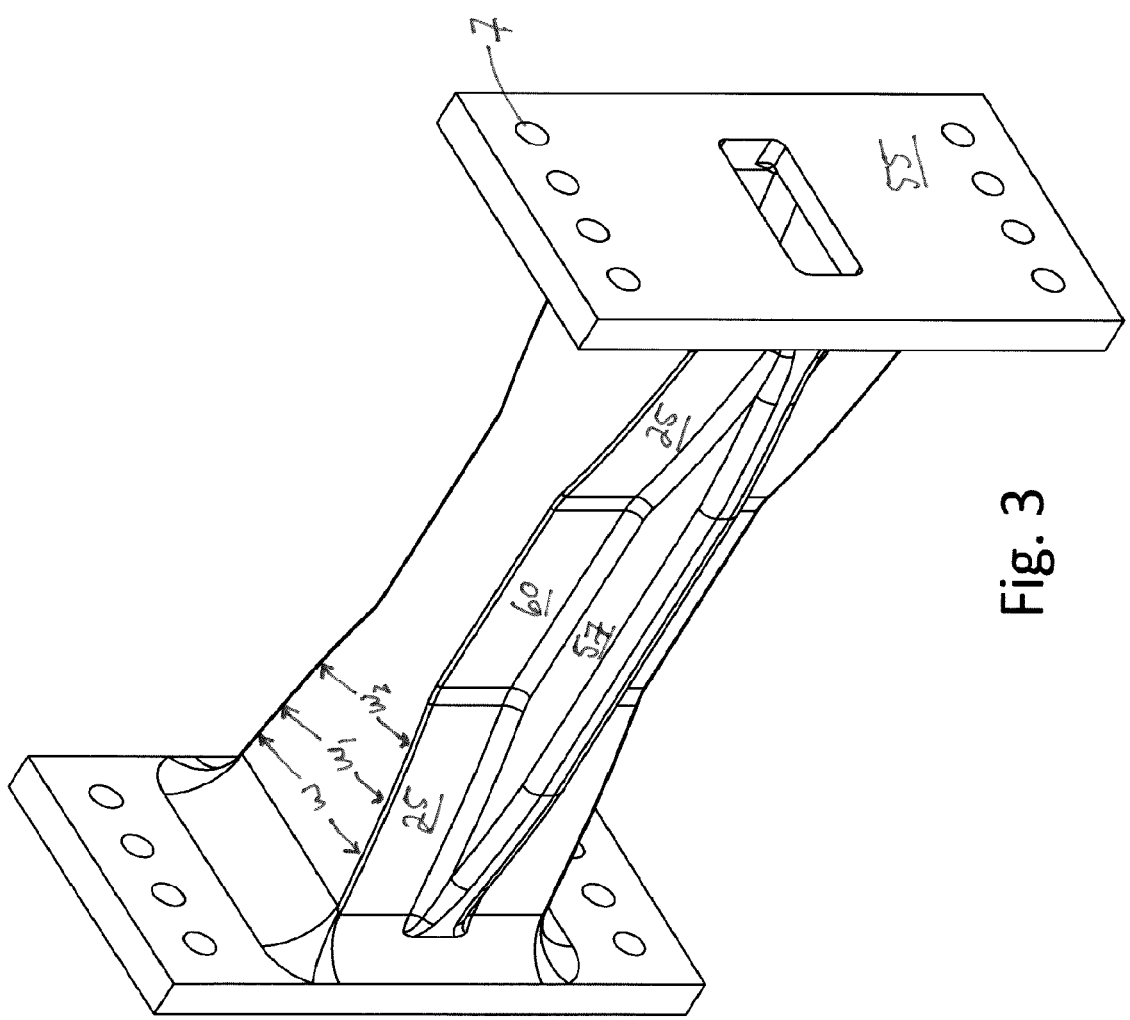
FIG. 3 is a perspective view of the yielding link of FIG. 1.

Referring now to FIGS. 1-3, there is shown a first embodiment of the invention in which a yielding link 10 is used to connect adjacent beams 12 in an eccentrically braced frame arrangement 5. As described earlier, the frame is considered eccentrically braced since the braces 8 are not connected at a common working node of the frame 5 at their ends proximate the beams 12. The link 10 has a substantially rectangular cross-section 15 that is hollow along a portion of its length, as indicated by the dashed-line portions 20 in FIGS. 2A and 2B. Variable cross-section portions 25 of the link, beginning proximate either ends of the link have a constant depth and a varying width, and are preferably hollow throughout, or substantially hollow throughout. In the centre of the link 10, there is a constant cross-section or solid portion 60, which adjoins the two variable portions 25, and define termination points 65 of the hollow portions 20. For the purposes of this application, "depth" is defined as the direction perpendicular to the ground on which the frame is assembled or along the z-axis in FIG. 3, and "width" is defined as a direction parallel to the ground and perpendicular to the elongate axis of the beams to which the link is attached or along the y-axis in FIG. 3.

The thicknesses of the top 30 and bottom 35 walls of the variable portion varies linearly. That is, the material thickness of the wall bounding a top surface 40 of the variable portion with a top surface of the hollow portion 20 is linearly variable, as illustrated. Meanwhile, the thickness of the side walls 45 is held constant. That is, the material thickness of the wall bounding the sidewall 50 of the variable portion 25 and the sidewall of the hollow portion 20 is constant.

The variation in the width from w to w1 to w2 of the variable portion 25 may be linear in some embodiments, but is most preferably defined by a higher-order function that is defined to ensure that the hollow portions 20 of the link 10 yield simultaneously when subjected to a linearly varying, double curvature bending moment diagram, combined with shear, axial, and torsional forces at the ends 55 of the link 10. An example and derivation of such a higher order function is provided in the Example further below in this description.

The vertical walls 45 of the hollow sections 20 and the solid centre 60 of the yielding portion 70 of the link 10 are designed to have adequate shear and axial strength for the combined forces that could be applied within the expected range of deformations in a typical eccentrically braced frame building or a link column frame, depending on the application. The cross section of the link also includes an optional flange 57 at the neutral axis that has been shaped, and otherwise dimensioned such that the cross sectional area of the link remains constant throughout the yielding portions. The flange 57 is preferably located at a mid-region of the link, and extends across the length of the link. The transition region 67 between the end connection 55 and the yielding portion 70 of the link 10 includes additional material to increase the thickness so as to ensure that stress and strain resulting from flexural or shear yielding does not propagate into the connection ends 55 during cyclic loading. Practically, the ends 55 and the transition region 67 are designed, sized, and otherwise dimensioned to prevent failure or yielding of the link 10 at the connection with either beam 12 or at a portion of the link 10 proximate this connection. The specific dimensions of the link 10 and sizing of each of the elements described above will be dependent upon the specific implementation and will be calculable by one skilled in the art in view of this description.

Figure 4:
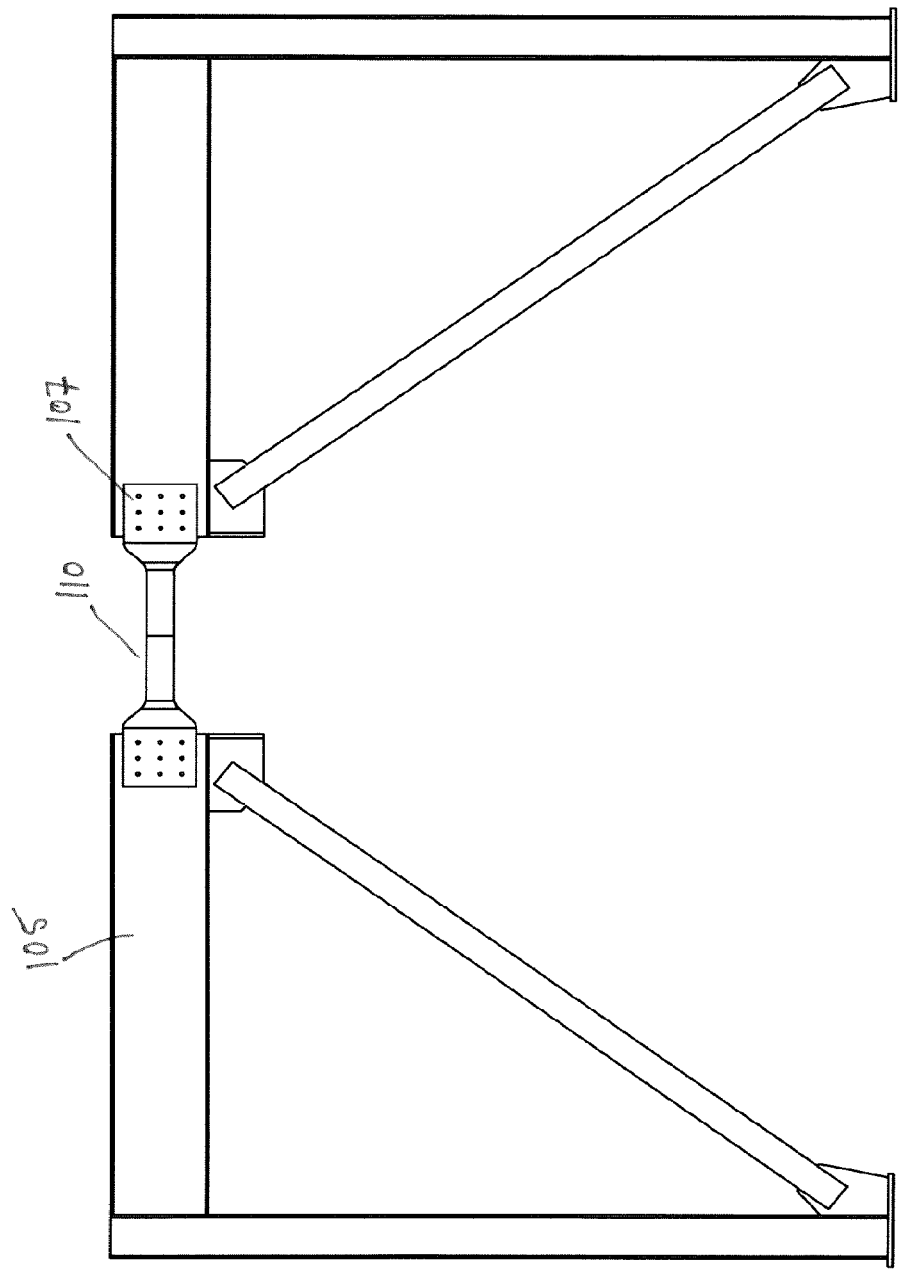
FIG. 4 is an elevation view of a yielding link in an eccentrically braced frame according to another embodiment of the invention.
Figure 5A:
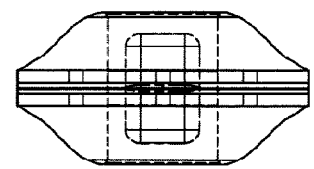
FIGS. 5A, 5B and 5C show side, top and end views, respectively, of the yielding link of FIG. 4.
Figure 5B:
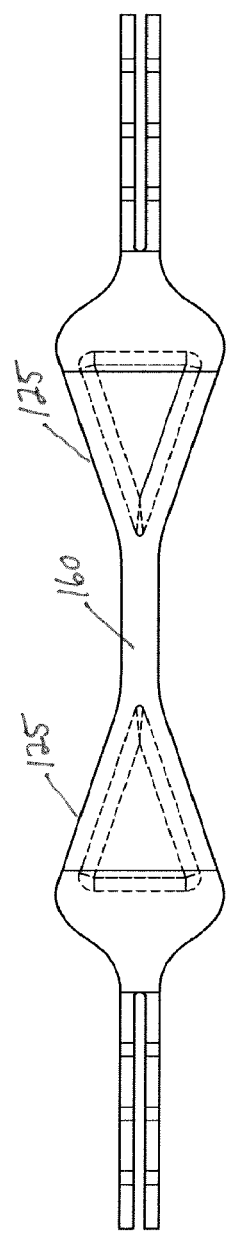
Figure 5C:
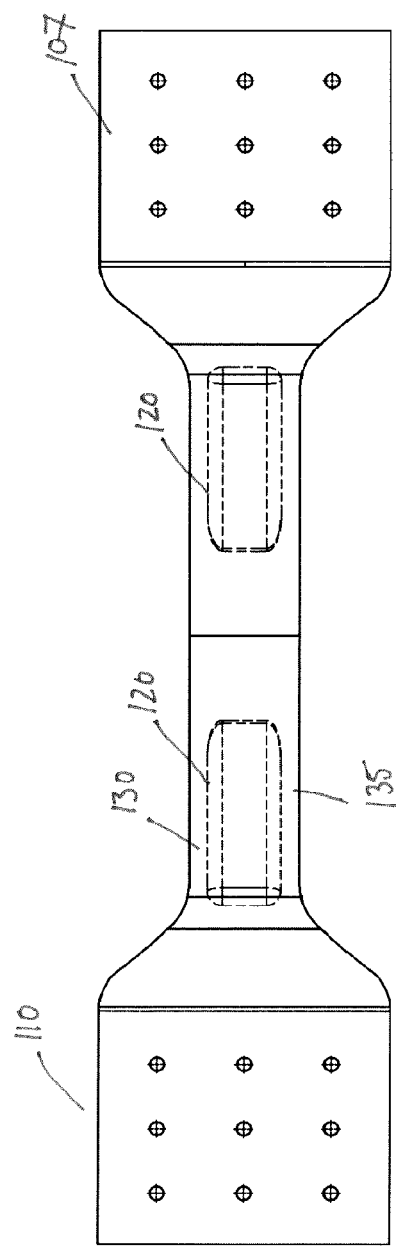
Figure 6:
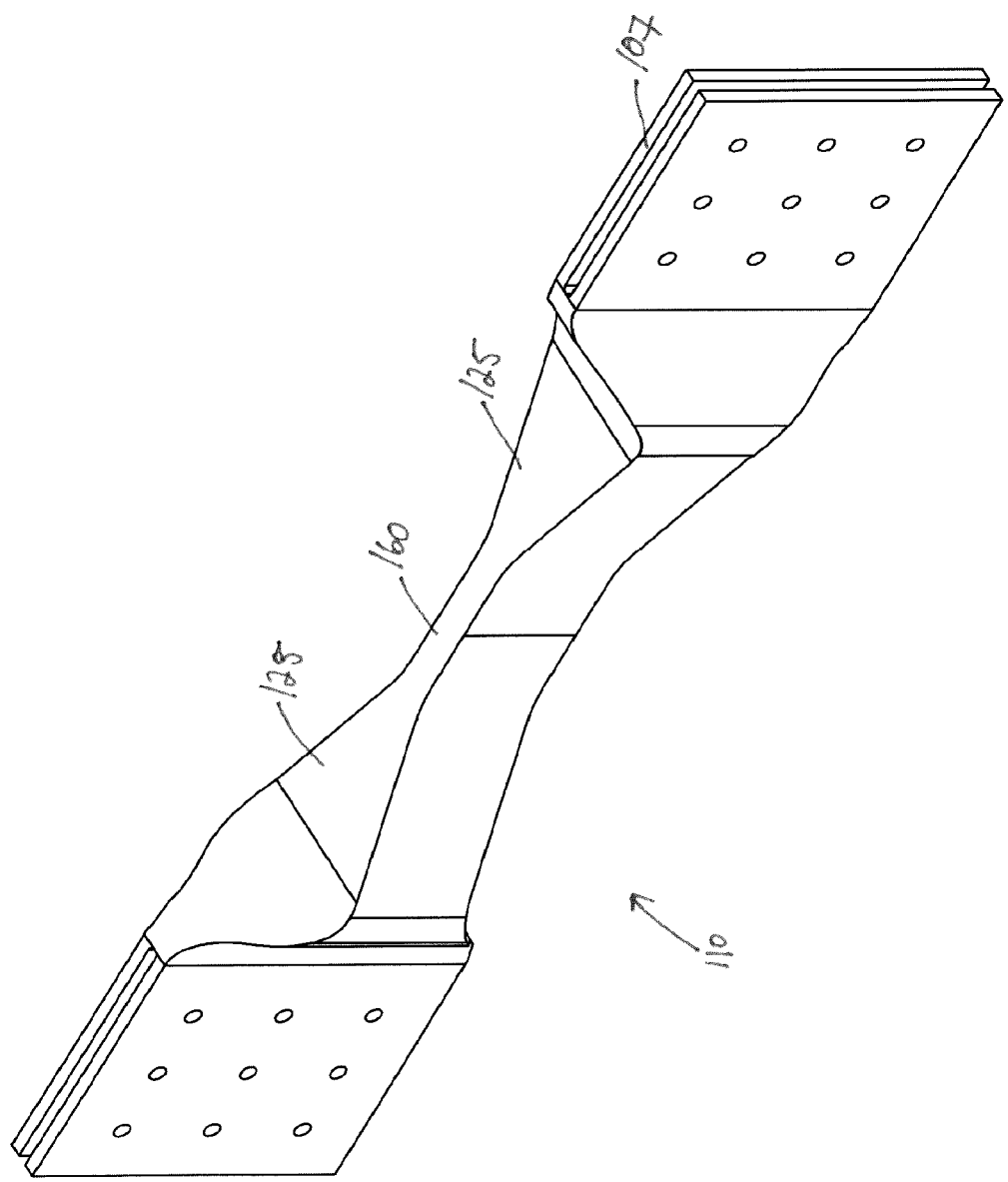
FIG. 6 is a perspective view of the yielding link of FIG. 4.

Referring now to FIGS. 4-6, there is shown a second embodiment of the invention in which a yielding link 110 is used to connect adjacent beams in an eccentrically braced frame arrangement 105. The link 110 has a substantially rectangular cross-section 115 that is hollow along a major portion of its length, as indicated by the dashed-line portions 120 in FIGS. 5A and 5B. Variable cross-section portions 125 of the link have a constant depth and a varying width. The varying, and in particular, tapering width as illustrated is designed to promote yielding along the entire length of the variable cross-section portions 125. At the centre of the link 110, there is a solid portion 160, which adjoins the two variable cross-section portions 125.

The thicknesses of the top 130 and bottom 135 walls of the variable cross-section portion 125 is maintained constant, in distinction to the embodiment of FIGS. 1-3. In this embodiment, the walls of the variable cross-section portion 125 and of the solid portion 160 are designed, sized and otherwise dimensioned to have adequate shear and axial strength for the combined forces that could theoretically be applied within the expected range of deformations in a typical eccentrically braced frame structure. Additional details of this embodiment may be as described with respect to the embodiment of FIGS. 1-3.

Figure 7:
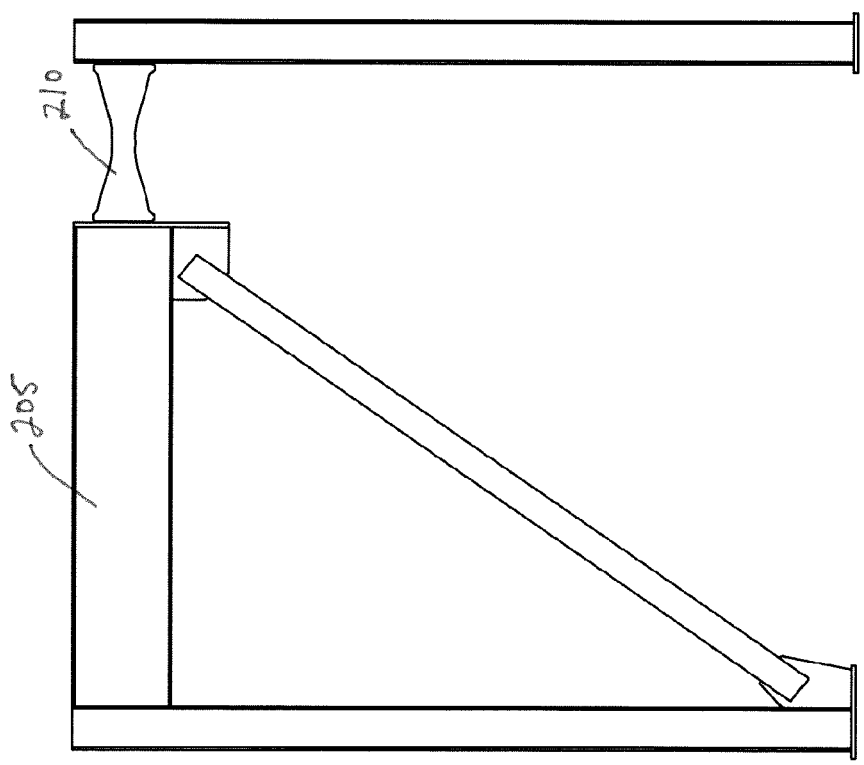
FIG. 7 is an elevation view of a yielding link in a single-brace eccentrically braced frame according to another embodiment of the invention.
Figure 8:
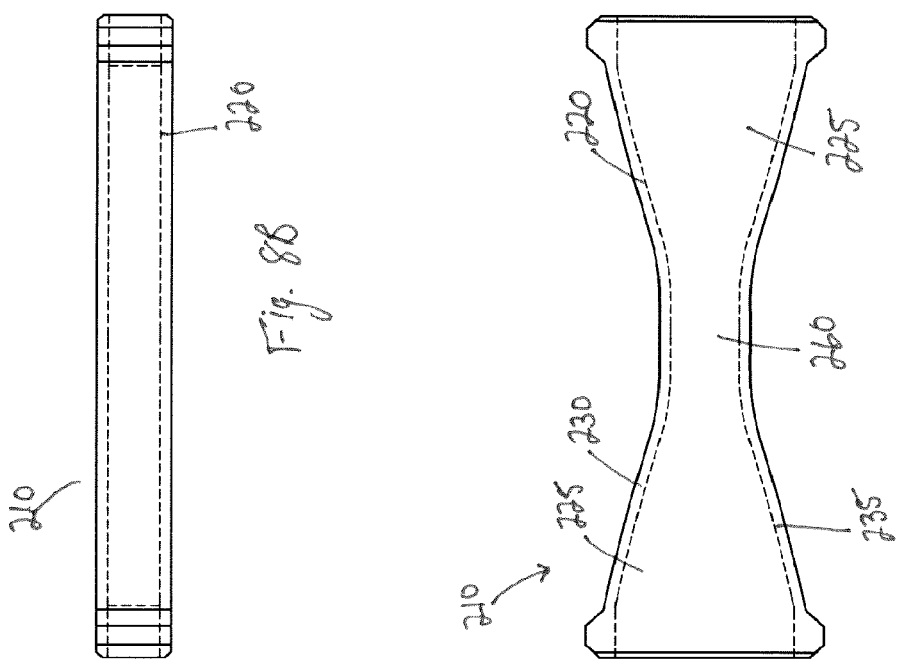
FIGS. 8A, 8B and 8C show side, top and end views, respectively, of the yielding link of FIG. 7.
Figure 9:
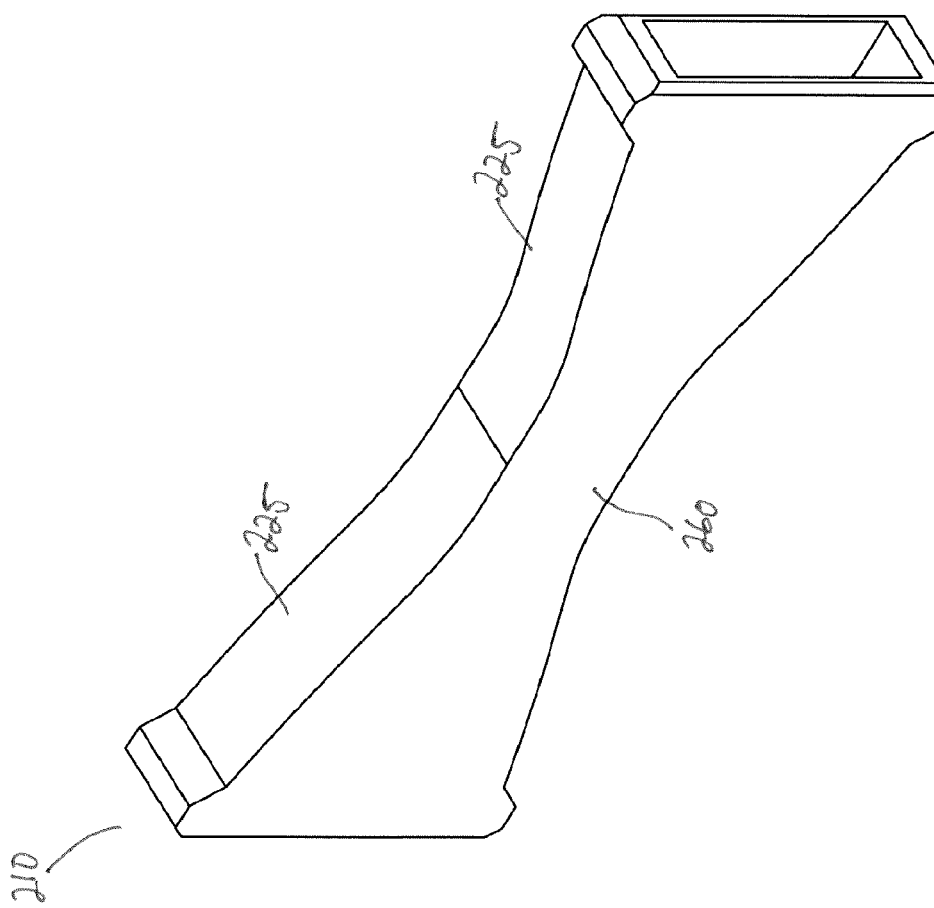
FIG. 9 is a perspective view of the yielding link of FIG. 7.

In a third embodiment of the invention, as illustrated in FIGS. 7-9 there is shown a yielding link 210 having a substantially rectangular cross-section 215 that is hollow along all of its length, as indicated by the dashed-line portions 220 in FIGS. 8A and 8B. Variable cross-section portions 225 of the link have a varying depth and a constant width and wall thickness within the variable cross-section portions 225. The varying, and in particular, tapering depth as illustrated is designed to promote yielding along the entire length of the variable cross-section portions 225. At the centre of the link 110, there is a hollow, constant depth portion 260, which adjoins the two variable cross-section portions 225.

The thicknesses of the top 230 and bottom 235 walls of the variable cross-section portion 225 is maintained constant. The walls of the variable cross-section portion 225 and of the hollow, constant depth portion 260 are designed, sized and otherwise dimensioned to have adequate shear and axial strength for the combined forces that could theoretically be applied within the expected range of deformations in a typical eccentrically braced frame structure. Additional details of this embodiment may be as described with respect to the embodiment of FIGS. 1-3.

Figure 10:
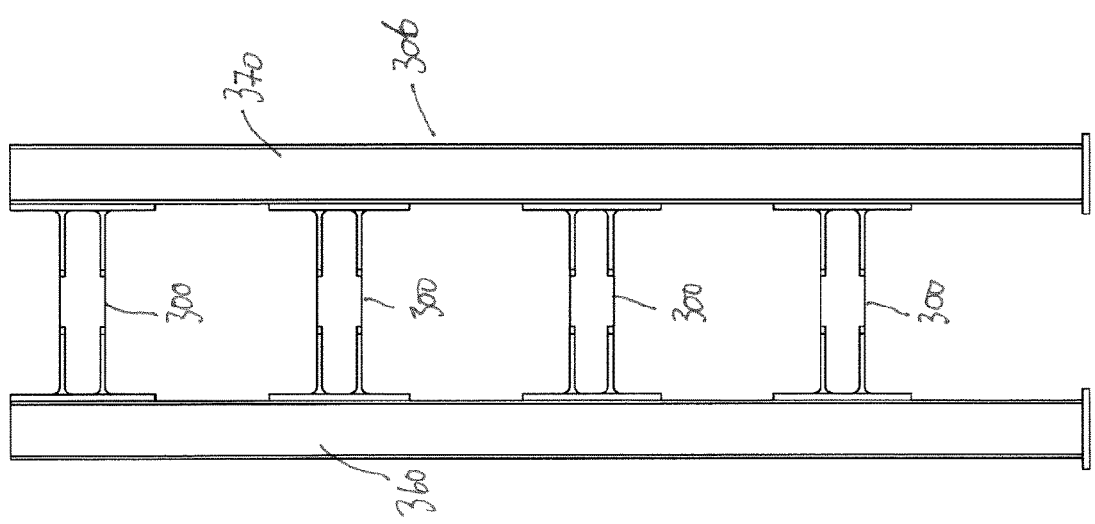
FIG. 10 is an elevation view of a yielding link in a linked column frame according to another embodiment of the invention.
Figure 12:
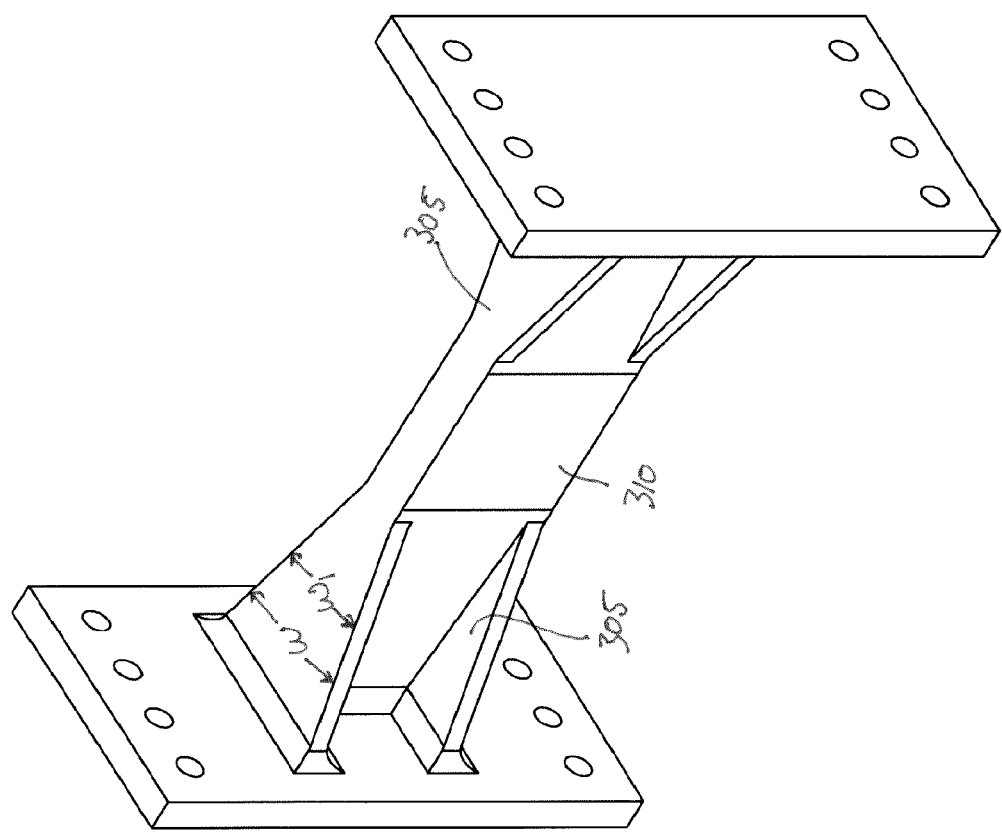
FIG. 12 is a perspective view of the yielding link of FIG. 10.

In other contemplated alternatives, the yielding segment of the link may have cross-sections other than substantially rectangular cross-sections as described in the previous embodiments. The cross-section may be any shape or configuration that has a variable, and preferably tapered, cross-section such that flexural yielding along a substantial portion of the length of the link is promoted. On example of this is shown in the embodiment of FIGS. 10-12 where a link 300 has a primarily "I" shaped cross section. The width w of the flanges 305 of the "I" shape varies along the length of the link, thus providing for the variable cross-section. The varying cross-section of the flanges 305 is intended to promote yielding along most of the length of the yielding segment of the link. In this embodiment the web 310 of the "I" section is designed to have adequate shear and axial strength for the combined forces that could be applied within the expected range of deformations in a typical eccentrically braced frame building. The thickness of the web 310 is tapered along the length of the link such that at any section the yield moment matches the applied bending moment (thereby resulting in distributed flexural yielding) and the cross sectional area is constant (thereby resulting in a uniform axial strain along the length).

Other variable cross-sections, and in particular tapered cross-sections are also contemplated. Any of the above described embodiments could be used in a variety of eccentrically braced frame configurations (for example, the link in the centre of the beam or the link at the beam column intersection) or in linked column frame configurations. Other shapes and cross-sections are known in the art, and to which the teachings of this invention in respect of one or more of the variability of the cross-sections, the hollow portion within the variable cross-section portion or the solid centre portion having a constant cross-section may be applied to prior art link cross-sectional shapes. This statement is not intended to limit the invention to requiring each of the variable cross-section portion, hollow portion within the variable cross-section portion and the constant cross-section centre portion in combination as essential features. Rather, the invention is only limited by the claims that follow this description.

There are a number of means by which the link can be connected to the other elements of the structural frame, be it the eccentrically braced frame or a linked column frame. For example, in the embodiment FIG. 1, the link 10 is shown at the centre of a chevron-type eccentrically braced frame 5. The link 10 is connected to the beams of the frame with a bolted end-plate type connection. To accommodate this type of connection the ends of the yielding segment of the link have large, vertically oriented plate elements 7 that bolt to corresponding end plates 3 on the ends of the beam elements of the structural frame. This connection would be designed to have the strength to resist the combination of bending moment, shear and axial force that would be induced in the expected range of deformations in a typical eccentrically braced frame building. Another feature of this implementation would be a small, protruding extension of the plate extending within the hollow of the yielding segment, in order to increase the rigidity at the intersection of the end plate and the yielding segment of the link 10, thereby ensuring the deformations are isolated within the yielding segment of the link.

The embodiment of FIG. 4 is also shown at the centre of a chevron type eccentrically braced frame. This embodiment is connected to the webs of the beams of the brace with a bolted shear connection via plates 107.

The link 210 of FIG. 7 is shown at the beam column intersection of a single brace eccentrically braced frame 205. The link 210 is connected to the beam and the face of the column via a welded connection. At the end of the yielding portion the walls 230 of the end portions 225 are made thicker than the walls 230, 235 in the variable cross-section portion 225. This additional material thickness is provided to ensure that yielding does not propagate to the vicinity of the weld. The welded joint between the tapered replaceable link and the end plate of the beam, or the face of the column, can be achieved with fillet welds or groove welds, or other weld details.

The embodiment of FIG. 10 is shown in a linked column frame 300 having columns 360 and 370 of adjacent column frames, which are linked by the links 300. This embodiment is shown with a bolted end plate type connection which would bolt to the faces of the two columns in the system.

Other end connection configurations are possible but not illustrated, provided the end connection is designed to resist the combination of bending moment, shear and axial force that would be induced in the expected range of deformations in a typical eccentrically braced frame building, would not change the primary function or behaviour of the replaceable link.

The various embodiments of the link as herein described may be formed by casting, which provides a manner for creating the optionally complex or higher order tapering of the variable cross-section portion of the link of some embodiments. It is also noteworthy that such casting processes permit for the hollow portions, and variable thickness of certain walls as described above, as the link can be manufactured to have complex or detailed geometries both on the outer portions and within the hollow portions as well, such as the varying wall thickness as described in some embodiments above. Casting the link as a single body would also eliminate the need to weld various plates together within the yielding region. This would eliminate the potential for premature fractures, which is a risk when welds are subjected to large inelastic strain. Cast would also eliminate sharp geometric transitions which could create undesirable stress concentrations in the yielding region.

EXAMPLE

While linear tapered cross-sections are contemplated in the variable cross-section portion of the link, as herein described, there are additional advantages to providing a tapering which follows a higher order function in defining segments of the variable cross-section of the link. In order to implement the variable cross-section link of FIGS. 1-3, and in particular with a higher order function defining the tapering and variable cross-section, applicant has contemplated one example of defining the profile of the tapering width of the variable cross-section.

Figure 13:
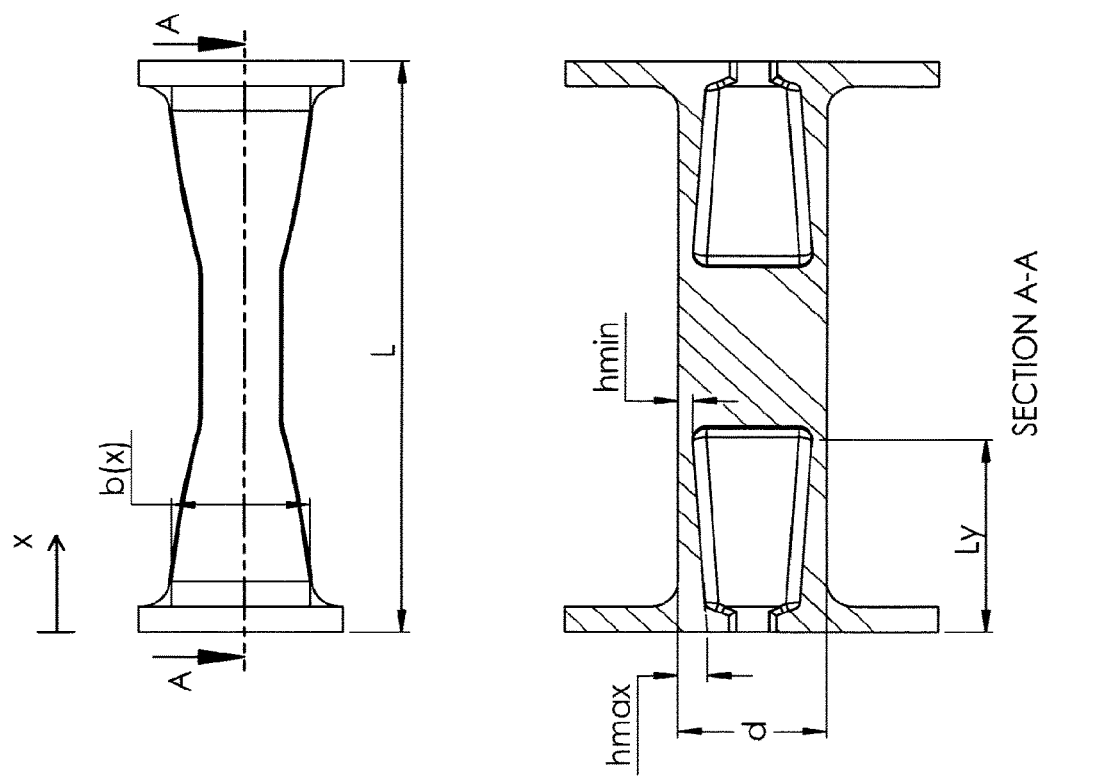
FIG. 13 is a reference diagram showing key variables in the design of the yielding link according to the invention.

Referring to FIG. 13, a profile of the link 1305 is derived from the following derivation defining the profile of the tapering of the width of the section, b(x), which considers the plastic capacity of the flanges (top and bottom walls) of the box section and ignores the any contribution from the webs of the box section as being negligible. It is assumed that the link is deformed in double curvature. The assumed applied shear on the link, V, is combined with the length of the link to define applied moment at any point, x, along the length of the link. The applied moment is in turn used to define profile of the section. The generalized profile of the tapering as a function of the applied shear, V, yield strength of the material, $F_y$, depth of the section, d, and the tapering of the flange thickness, h(x), is presented in the following equation:

$$b(x) = \frac{V(L-2x)}{2h(x)F_y[d-h(x)]}$$

In the particular embodiment of interest the thickness of each flange, h(x), varies linearly from thick at the end to thin in the middle of the yielding link. The equation describing the flange thickness at any point, x, along the length of the yielding portion of the link, is presented below as a function of the maximum flange thickness, $h_{max}$, minimum flange thickness, $h_{min}$, and the length of the yielding portion, $L_y$:

$$h(x) = h_{max}\left(1 - \frac{x}{L_y}\right) + h_{min}\frac{x}{L_y}$$

Substituting these two equations would give the specific equation defining the width of the flange along the length of the link between the connection end (x=0) to the inner end of the yielding portion of the link (x=$L_y$).

$$b(x) = \frac{V}{2F_y} \times \frac{(L-2x)}{dh_{max} - h_{max}^2 + [-dh_{max} + dh_{min} + 2h_{max}^2 - 2h_{max}h_{min}]\left(\frac{x}{L_y}\right) - [h_{max} - h_{min}]^2\left(\frac{x}{L_y}\right)^2}$$

The side walls of the link include a ridge located at the section's neutral axis which is proportioned such that the cross-sectional area of the link at any location is the same despite the tapering width of the link. The area of the external flanges, $A_{flanges}(x)$, was determined based on the following equation:

$$A_{flanges}(x)=2[b(0)h_{max}-b(x)h(x)]$$

In this particular embodiment the transition region between the yielding portions and the end connections includes thickened segments which limit the spread of plastic strain into the connection region.

This is example is intended to show one way in which the variable cross-section could be generated in accordance with the principles set forth in this description, and is not intended to limit the invention in any manner. As discussed earlier, the variable cross-section portion could also be a linearly variable profile or be defined by a lower order function that that described in this example.

Various other modifications may be made or alternatives implemented without departing from the invention, which is defined solely by the claims that now follow.

The invention claimed is:

1. A structural yielding link for use in an eccentrically braced frame structure, the structural yielding link comprising a yielding portion comprising: a body portion having a substantially constant exterior cross-section; a first variable cross-section portion extending from a first end of the body portion to a first end of the structural yielding link, the first variable cross-section portion being hollow, and increasing in exterior cross-section from the first end of the body portion to the first end of the structural yielding link; and a second variable cross-section portion extending from a second end of the body portion to a second end of the structural yielding link, the second variable cross-section portion being hollow, and increasing in exterior cross-section from the second end of the body portion to the second end of the structural yielding link, the body portion and the first and second variable cross-section portions forming a single piece; a cross-sectional area of the material forming the structural yielding link being substantially constant along a length of the yielding portion, wherein the cross-sectional area of the material forming the structural yielding link is either maintained substantially constant along the length of the yielding portion by decreasing a thickness of the walls of the first variable cross-section portion and the second variable cross-section portion in the direction from the body portion to the respective first or second end of the structural yielding link, or providing at least one flange at a flexural neutral axis of the structural yielding link along the length of the yielding portion, or both.

2. The structural yielding link of claim 1, wherein the first variable cross-section portion and the second variable cross-section portion yield nearly simultaneously along a substantial portion of their respective lengths when subjected to a bending moment that varies linearly along the length of the structural yielding link.

3. The structural yielding link of claim 1, wherein the body portion is substantially solid.

4. The structural yielding link of claim 3, wherein the exterior cross-section of each of the first variable cross-section portion and the second variable cross-section portion increases in a first dimension and remains substantially constant in a second dimension.

5. The structural yielding link of claim 4, wherein the first dimension is a width of the first variable cross-section portion and a width of the second variable cross-section portion.

6. The structural yielding link of claim 1, wherein the first variable cross-section portion and the second variable cross-section portion have a rectangular or square exterior cross-section.

7. The structural yielding link of claim 1, wherein each of the first variable cross-section portion and the second variable cross-section portion comprise respective pairs of opposing walls, and wherein in each of the first variable cross-section portion and the second variable cross-section portion, at least one pair of opposing walls increase in thickness in the direction from the body portion to the respective first or second end of the structural yielding link, the structural yielding link further comprising at least one flange located at a flexural neutral axis of the structural yielding link and extending along the yielding portion, the at least one flange being shaped such that the cross-sectional area of the material is substantially constant along the length of the yielding portion.

8. The structural yielding link of claim 7, wherein the second pair of opposing walls are top and bottom walls.

9. The structural yielding link of claim 7, wherein the second pair of opposing walls linearly increase in thickness.

10. The structural yielding link of claim 7, wherein the second pair of opposing walls increase in thickness according to a higher order function.

11. The structural yielding link of claim 7, wherein the second pair of opposing walls increase in thickness such that the first variable cross-section portion and the second variable cross-section portion yield nearly simultaneously along a substantial portion of the structural yielding link when subjected to a linearly varying bending moment.

12. The structural yielding link of claim 1, wherein each of the first variable cross-section portion and the second variable cross-section portion comprise respective pairs of opposing walls, and wherein in each of the first variable cross-section portion and the second variable cross-section portion, at least one pair of opposing walls decrease in thickness in the direction from the body portion to the respective first or second end of the structural yielding link.

13. The structural yielding link of claim 1, wherein the walls increase in thickness at one or more transition regions between the first variable cross-section portion and the first end of the body portion and between the second variable cross-section portion and the second end of the body portion, the transition region comprising a thickened material portion for reducing stress and/or strain propagating to the first end and the second end of the structural yielding link, during yielding of the structural yielding link.

14. The structural yielding link of claim 1, wherein each of the first end and the second end of the structural yielding link are configured to be connected to a beam and/or column of a structure.

15. A building structure comprising the structural yielding link of claim 1.

16. The building structure of claim 15, wherein:
the building structure comprises an eccentrically braced frame structure having a first beam portion and a second beam portion, the first end of the structural yielding link being mounted to an end face of the first beam portion and the second end of the structural yielding link being mounted to an end face of the second beam portion, the structural yielding link extending in line with the first beam portion and the second beam portion.

17. The building structure of claim 15, wherein:
the building structure comprises an eccentrically braced frame structure having a beam portion and a column, the first end of the structural yielding link being mounted to an end face of the beam portion and the second end of the structural yielding link being mounted to the column.

18. The building structure of claim 15, wherein:
the building structure comprises linked column frame structure having a first column and a second column, the first end of the structural yielding link being mounted to the first column and a second end of the structural yielding link being mounted to the second column.

19. The structural yielding link of claim 12, wherein the walls increase in thickness at one or more transition regions between the first variable cross-section portion and the first end of the body portion and between the second variable cross-section portion and the second end of the body portion, the transition region comprising a thickened material portion for reducing stress and/or strain propagating to the first end and the second end of the structural yielding link, during yielding of the structural yielding link.

* * * * *